UNITED STATES PATENT OFFICE.

L. H. VAN SPANCKEREN, OF MUSCATINE, IOWA.

IMPROVEMENT IN THE MANUFACTURE OF SOAP.

Specification forming part of Letters Patent No. 58,919, dated October 16, 1866.

*To all whom it may concern:*

Be it known that I, L. H. VAN SPANCKEREN, of Muscatine, in the county of Muscatine and State of Iowa, have invented a new and useful composition of matter, being an Improved Soap; and I do hereby declare that the following is a full, clear, and exact description of the mode of compounding and preparing the same.

Take of wood-lye of 30° of strength, five and one-half pounds; grease, three pounds; potatoes, one and one-half pound; wheat-flour, six ounces; gum-tragacanth, two ounces; the yolks of four eggs.

In compounding the above-named ingredients the potatoes are first boiled, then mashed fine and passed through a sieve; then add one and a half pound of lye and stir until thoroughly mixed. The gum-tragacanth should be dissolved in a pound of lye, which will require about a week. The yolks of the eggs should be well beaten in a dish. Having thus prepared the ingredients, melt the grease in a kettle; then add the potatoes, then the gum, and then the eggs, mixing the ingredients thoroughly, the entire mass being kept at a heat a little higher than the hand can bear; then add the remainder of the lye and continue to stir thoroughly. The flour should now be added slowly and the heat increased until all the ingredients are entirely melted and thoroughly incorporated; then extinguish the fire and continue stirring until the soap becomes thick.

In using the soap thus compounded it should be placed in the wash-boiler with cold water and the clothes to be cleansed, and then the water should be heated to the boiling-point, and maintained at that temperature for about fifteen minutes. By renewing the water with clean cold water, adding the soap, and repeating the heating operation the clothes may be cleansed without rubbing.

What I claim as my invention, and desire to secure by Letters Patent, is—

A soap compounded and prepared from the ingredients and in the manner substantially as set forth.

In testimony whereof I have signed my name to this specification in the presence of two subscribing witnesses.

L. H. VAN SPANCKEREN.

Witnesses:
JOHN S. HEATON,
D. R. WARFIELD.